(12) United States Patent
Takahashi et al.

(10) Patent No.: US 9,625,353 B2
(45) Date of Patent: Apr. 18, 2017

(54) SHAPE INSPECTION DEVICE

(71) Applicant: Kobe Steel, Ltd., Hyogo (JP)

(72) Inventors: Eiji Takahashi, Kobe (JP); Kaname Araki, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 44 days.

(21) Appl. No.: 14/783,061

(22) PCT Filed: Mar. 20, 2014

(86) PCT No.: PCT/JP2014/001623
§ 371 (c)(1),
(2) Date: Oct. 7, 2015

(87) PCT Pub. No.: WO2014/167784
PCT Pub. Date: Oct. 16, 2014

(65) Prior Publication Data
US 2016/0054200 A1 Feb. 25, 2016

(30) Foreign Application Priority Data
Apr. 8, 2013 (JP) .................................. 2013-080648

(51) Int. Cl.
*G01M 17/02* (2006.01)
*G01B 11/24* (2006.01)
(Continued)

(52) U.S. Cl.
CPC ............. *G01M 17/027* (2013.01); *G01B 3/30* (2013.01); *G01B 11/24* (2013.01); *G01B 21/042* (2013.01)

(58) Field of Classification Search
None
See application file for complete search history.

(56) References Cited

U.S. PATENT DOCUMENTS

| 6,539,789 B1 | 4/2003 | Kostka et al. |
| 2007/0093981 A1 | 4/2007 | Reynolds et al. |

(Continued)

FOREIGN PATENT DOCUMENTS

| JP | S63-108204 A | 5/1988 |
| JP | H04-321185 A | 11/1992 |

(Continued)

OTHER PUBLICATIONS

International Search Report, PCT/JP2014/001623, Jun. 24, 2014.
(Continued)

*Primary Examiner* — Andre Allen
(74) *Attorney, Agent, or Firm* — Studebaker & Brackett PC

(57) ABSTRACT

A raised and depressed plate has a base surface, a raised surface, and a depressed surface. A mask processing section is configured to use mask data in which a given region and the remaining region in each of the base surface, the raised surface and the depressed surface are defined as a valid region and an invalid region, respectively, to extract measurement data of the valid regions from measurement data obtained from the sidewall surface of the master disk. A master data generation section is configured to generate master data representing a surface shape of the master disk, by using the measurement data of the valid regions. A user can check measurement accuracy of a shape inspection device by comparing shape values of the raised and depressed plate with the master data.

5 Claims, 14 Drawing Sheets

(51) Int. Cl.
*G01B 21/04* (2006.01)
*G01B 3/30* (2006.01)

(56) References Cited

U.S. PATENT DOCUMENTS

| | | |
|---|---|---|
| 2008/0218742 A1 | 9/2008 | Sakoda et al. |
| 2011/0069323 A1 | 3/2011 | Takahashi et al. |
| 2012/0242824 A1 | 9/2012 | Takahashi et al. |
| 2014/0283591 A1* | 9/2014 | Takahashi ............ G01B 11/245 73/146 |
| 2014/0373614 A1* | 12/2014 | Steinbichler ........ G01M 17/027 73/146 |
| 2015/0168267 A1* | 6/2015 | Takahashi ............ G01B 11/24 356/606 |

FOREIGN PATENT DOCUMENTS

| | | |
|---|---|---|
| JP | H07-004931 A | 1/1995 |
| JP | 2007-121126 A | 5/2007 |
| JP | 2010-169450 A | 8/2010 |
| JP | 2010-181320 A | 8/2010 |
| JP | 2011-138208 A | 7/2011 |
| JP | 2011-141260 A | 7/2011 |
| JP | 5046688 B2 | 10/2012 |
| WO | 2009/148095 A1 | 12/2009 |

OTHER PUBLICATIONS

The extended European search report issued by the European Patent Office on Sep. 20, 2016, which corresponds to European Patent Application No. 14782951.9-1568 and is related to U.S. Appl. No. 14/783,061.

Notification of Transmittal of Translation of the International Preliminary Report on Patentability with English Translation of Written Opinion; issued in PCT/JP2014/001623; mailed on Oct. 22, 2015.

* cited by examiner

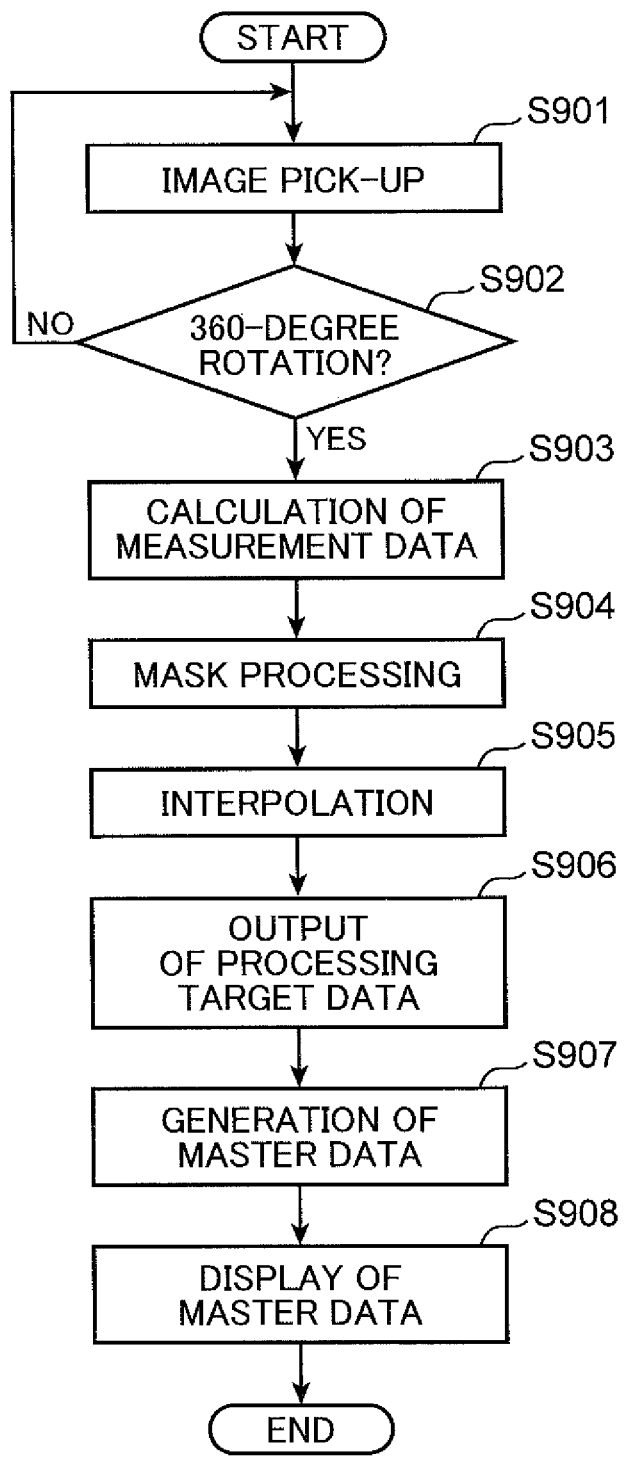

SHAPE INSPECTION DEVICE

TECHNICAL FIELD

The present invention relates to a shape inspection device for inspecting bulge and dent defects of a tire, and particularly to a technique of checking measurement accuracy of the shape inspection device.

BACKGROUND ART

In a tire manufacturing process, a test for inspecting a shape (profile) defect of a tire is performed in a final station. For example, in this test, a tire as an inspection target is subjected to a measurement using a laser displacement meter, while being rotated 360 degrees, to obtain tire shape data along a single line. Then, bulge and dent defects and a low-frequency undulation (run-out) of the tire are derived from the shape data to determine whether or not the tire is acceptable.

Recent years, in response to major tire manufacturers' appeals pointing out insufficiency of the shape measurement along only a single line, there has been increasingly employed a technique of emitting a sheet-shaped laser beam to a tire to measure shape data in the entire region of a measurement surface of the tire, and performing a determination as to the acceptability.

For example, the following Patent Literature 1 discloses a shape detection apparatus configured to maintain a positional relationship between a line-shaped beam emitting device and an imaging device in such a manner as to allow an angle between a tire surface and a line-shaped beam emitted from the line-shaped beam emitting means to be equal to an angle between the tire surface and a line extending from a reaching point of the line-shaped beam with respect to the tire surface to a center of an imaging element.

The following Patent Literature 2 discloses an apparatus which is operable to pick up a sample original image of a sidewall surface of a sample tire formed with a raised and/or depressed mark, to preliminarily extract a region of the raised and/or depressed mark from the sample original image and generate a height offset image, whereafter the apparatus is operable to subtract the height offset image, from an inspection image of a sidewall surface of an inspection target tire to inspect a shape defect of the inspection target tire, based on the resulting image.

The following Patent Literature 3 discloses a technique of checking inspection accuracy of an apparatus for inspecting a shape of a stator coil by using a light-section method, wherein a master workpiece which simulates a shape of a coil end of the stator coil is preliminarily provided as an inspection jig, and accuracy checking of the apparatus is performed using the master workpiece.

Meanwhile, deterioration in measurement accuracy of a shape inspection device is likely to lead to an undesirable situation where a tire having a shape defect is shipped. Thus, it is necessary to check inspection accuracy of the shape inspection device on a regular basis. In addition, it is desirable to allow the accuracy checking to be easily performed on a user side. In this regard, it is desirable that the accuracy checking can be performed without modifying software, e.g., without equipping a special measurement mode for the accuracy checking.

However, none of the Patent Literatures 1 and 2 includes any description about checking of inspection accuracy of the shape inspection device. In the Patent Literature 3, no consideration is taken for eliminating a need for modification of software, although consideration is taken for eliminating a need for modification of hardware.

CITATION LIST

Patent Literature

Patent Literature 1: JP 5046688B
Patent Literature 2: JP 2011-141260A
Patent Literature 3: JP 2010-169450A

SUMMARY OF INVENTION

It is an object of the present invention to provide a shape inspection device capable of checking measurement accuracy thereof without providing any special measurement mode in an existing shape inspection device.

According to one aspect of the present invention, there is provided a shape inspection device for measuring a surface shape of a tire to inspect bulge and dent defects of the tire based on a result of the measurement. The shape inspection device comprises: a measuring section configured to measure a surface shape of a measurement surface of a metal master disk which simulates the tire, wherein the measurement surface mounts thereon a raised and depressed plate having known shape values; a mask processing section configured to use mask data in which a given region of the raised and depressed plate is defined as a valid region and the remaining region other than the valid region is defined as an invalid region, to remove measurement data of the invalid region from measurement data measured by the measuring section; and a master data generation section configured to generate master data representing the surface shape of the measurement surface of the master disk, based on the measurement data after being subjected to removal of the mask region by the mask processing section.

The shape inspection device can easily check measurement accuracy thereof without providing any special measurement mode in an existing shape inspection device.

BRIEF DESCRIPTION OF DRAWINGS

Section (A) of FIG. 1 is a diagram illustrating an outline of a hardware configuration of a shape inspection device according to one embodiment of the present invention.

Section (B) of FIG. 1 is a top view of a raised and depressed plate.

Figure 1:
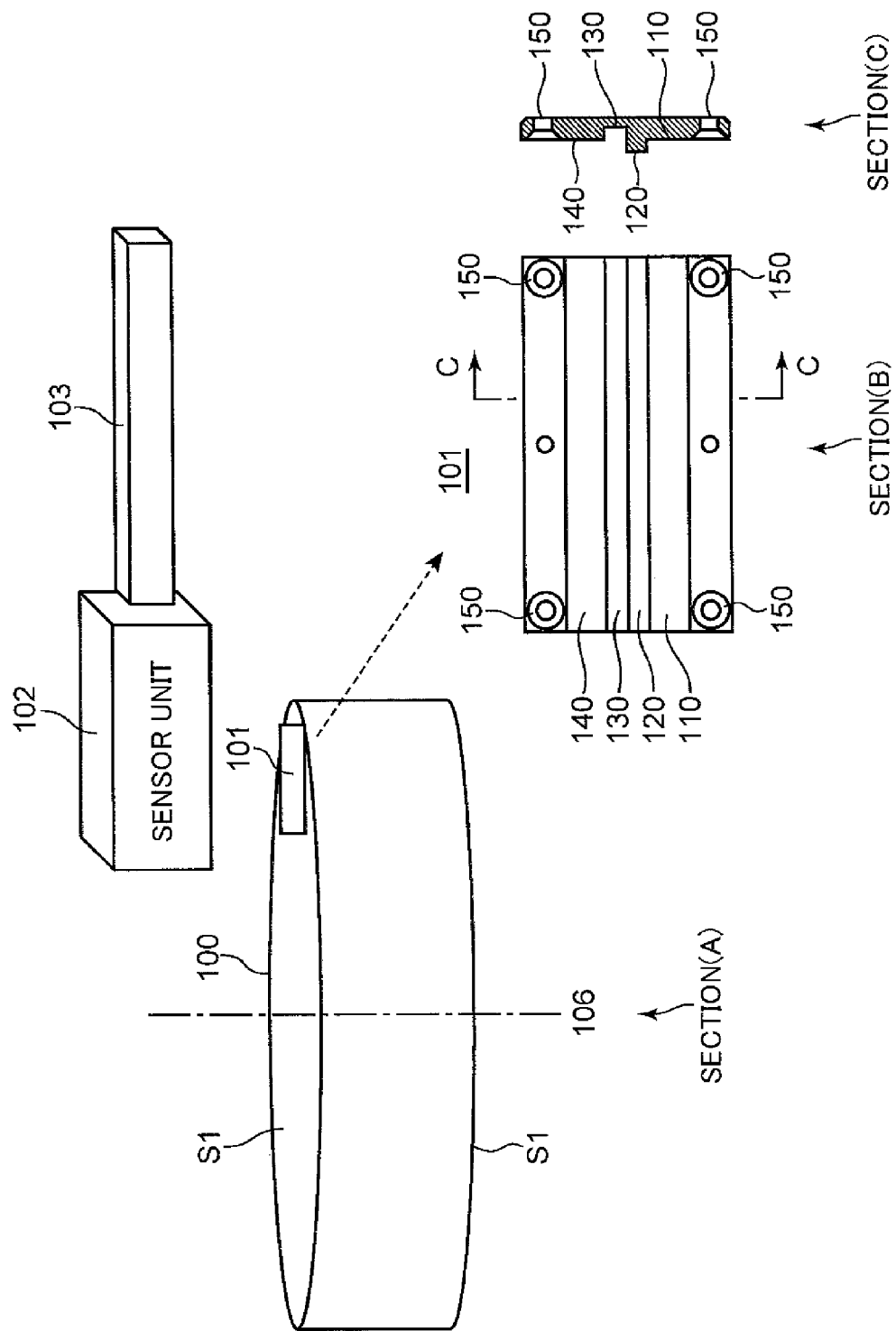

Section (C) of FIG. 1 is a sectional view of the raised and depressed plate, taken along the C-C direction.

Figure 2:
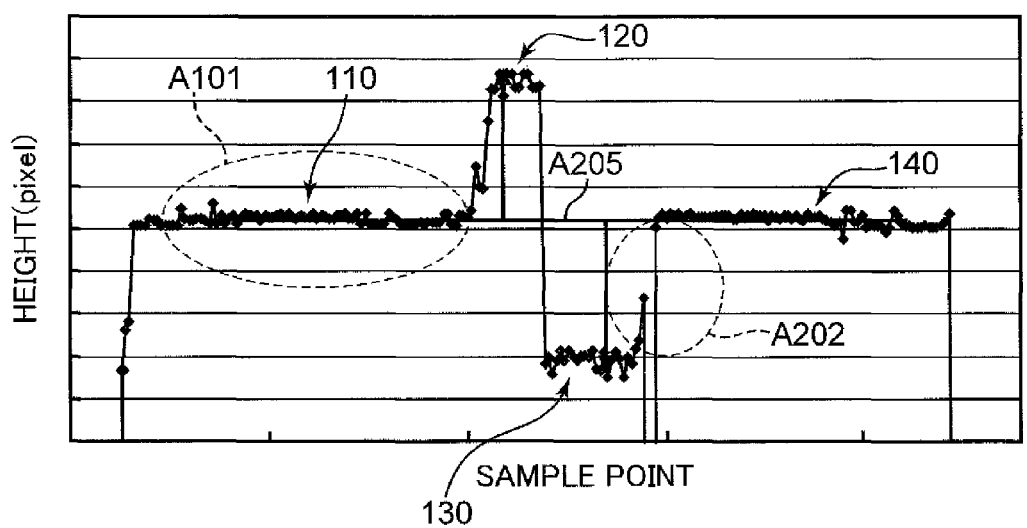

FIG. 2 is a graph illustrating measurement data of a master disk.

Figure 3:
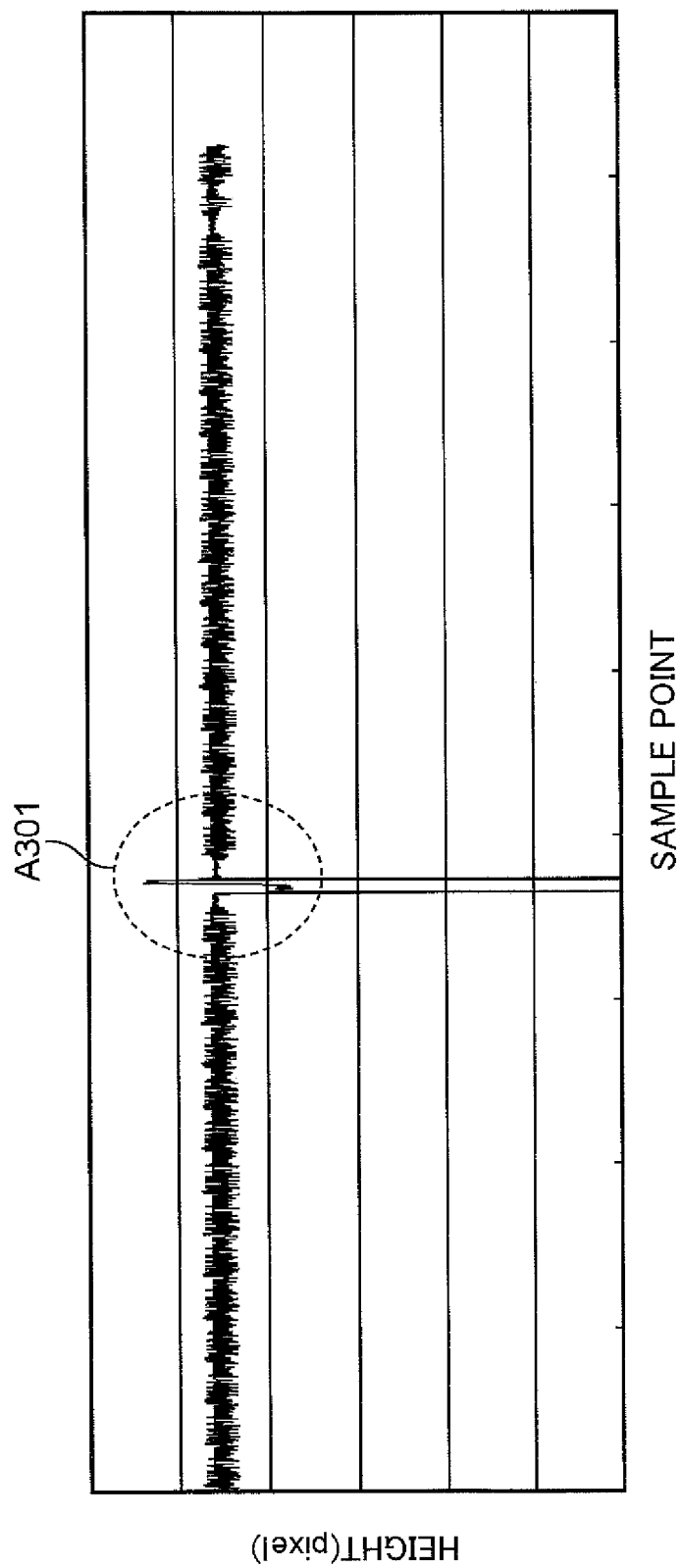

FIG. 3 is a graph illustrating measurement data corresponding to a 360-degree circumference of a certain one of a plurality of lines.

Figure 4:
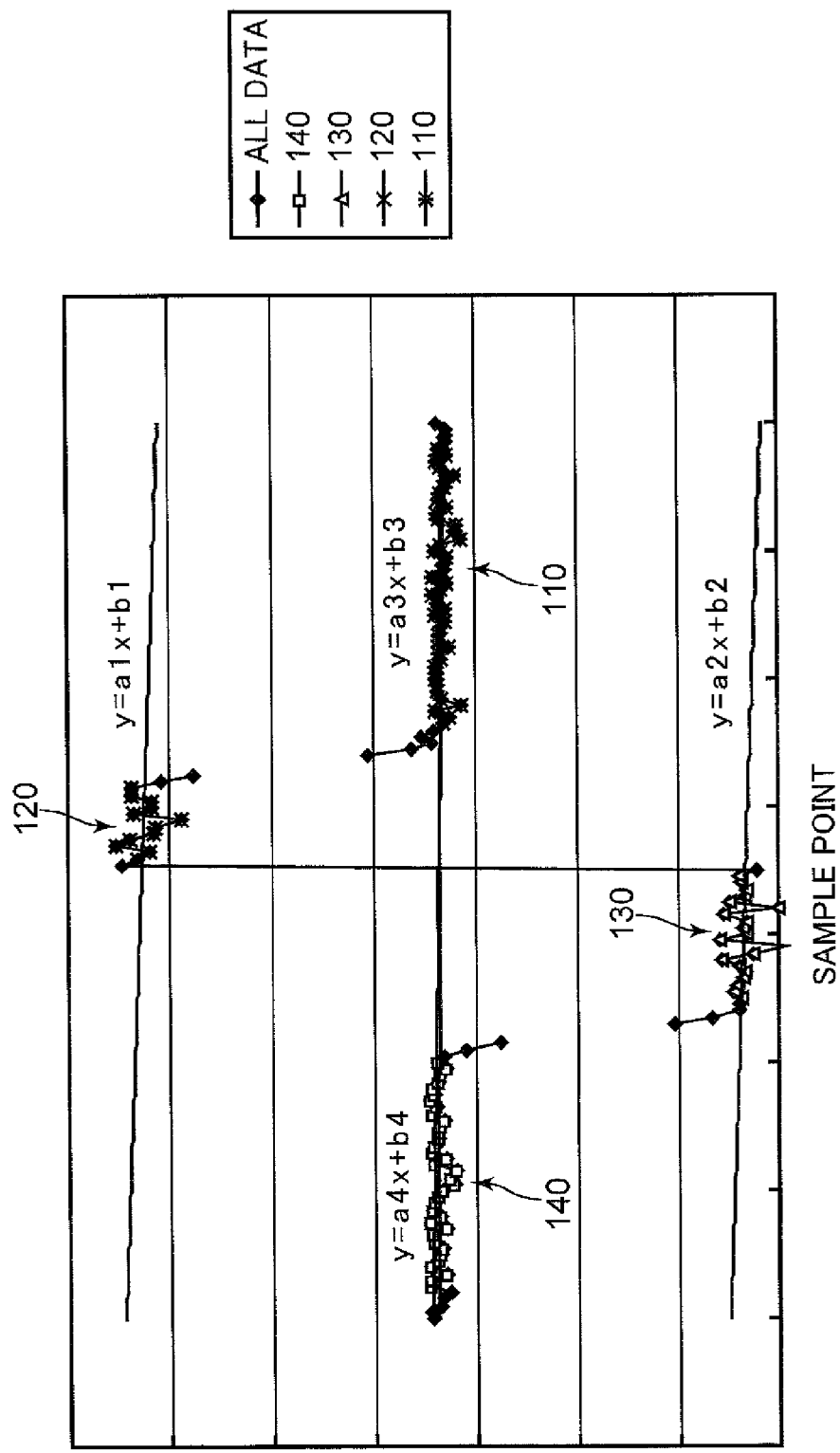

FIG. 4 is a graph enlargedly illustrating measurement data of a region in FIG. 3 corresponding to the raised and depressed plate.

Figure 5:
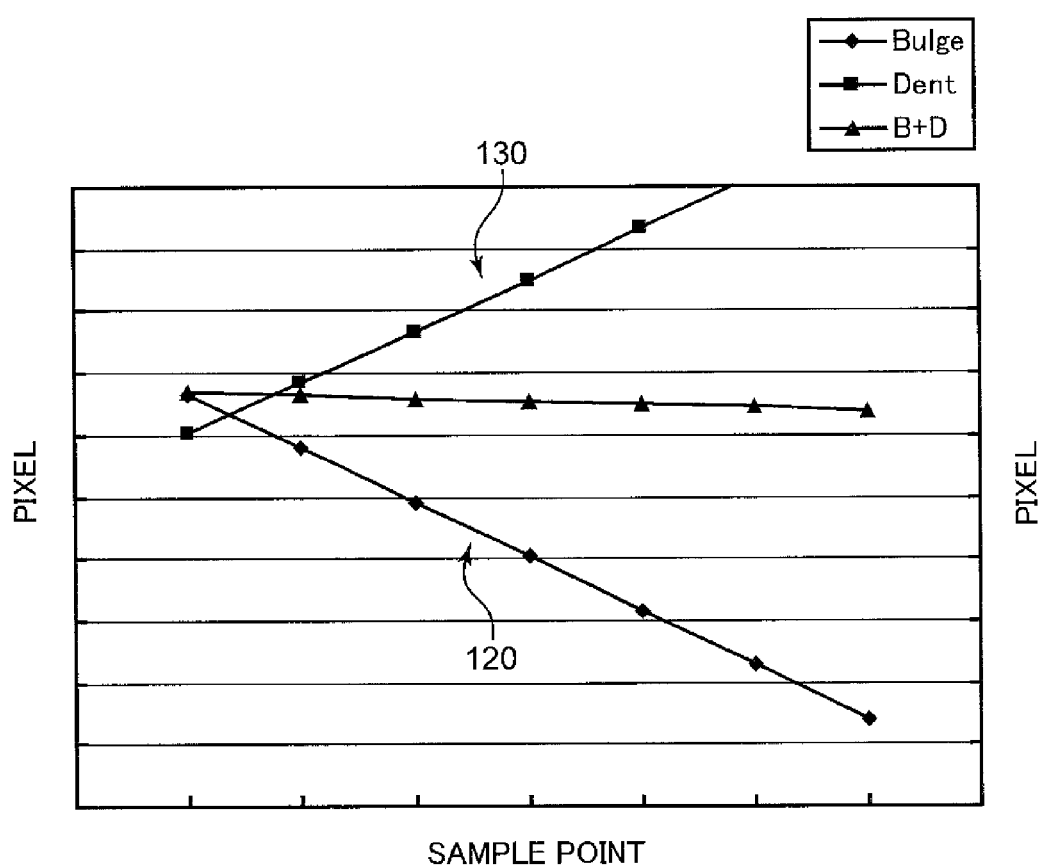

FIG. 5 is a graph illustrating a function representing a shape of a raised surface, a function representing a shape of a depressed surface, and a difference between the two functions.

Figure 6:
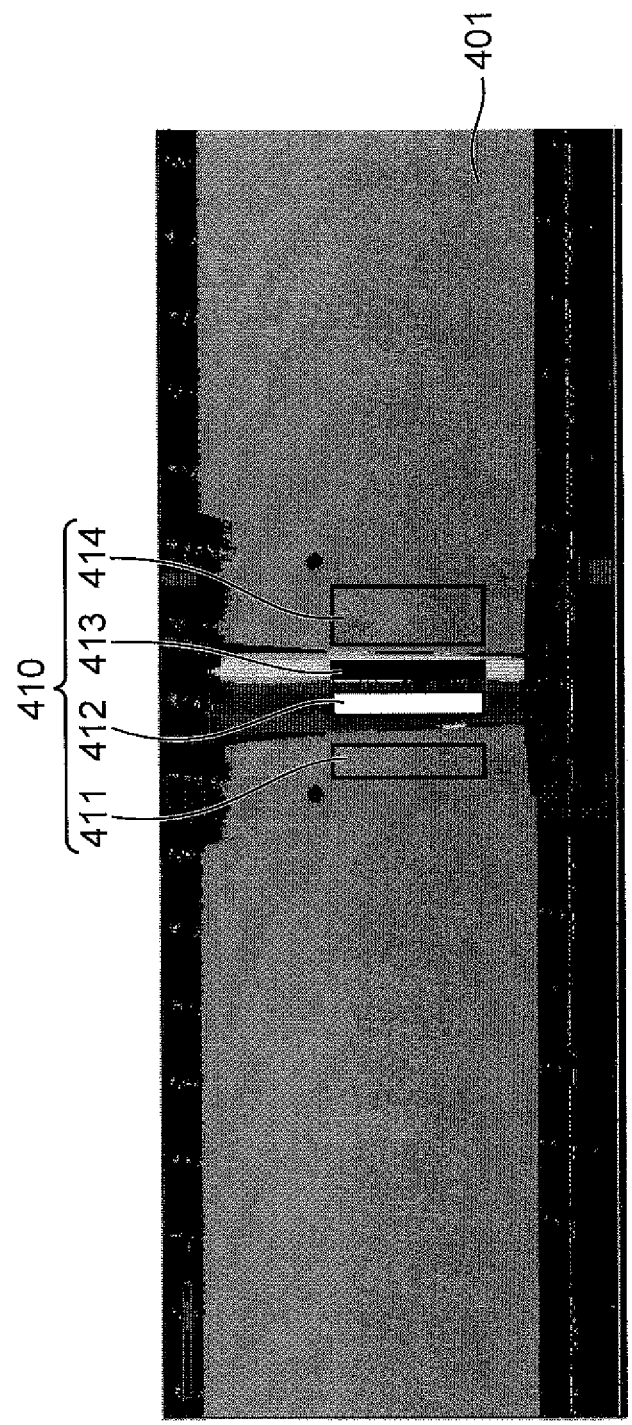

FIG. 6 is a schematic diagram of mask data in the embodiment of the present invention.

Figure 7:
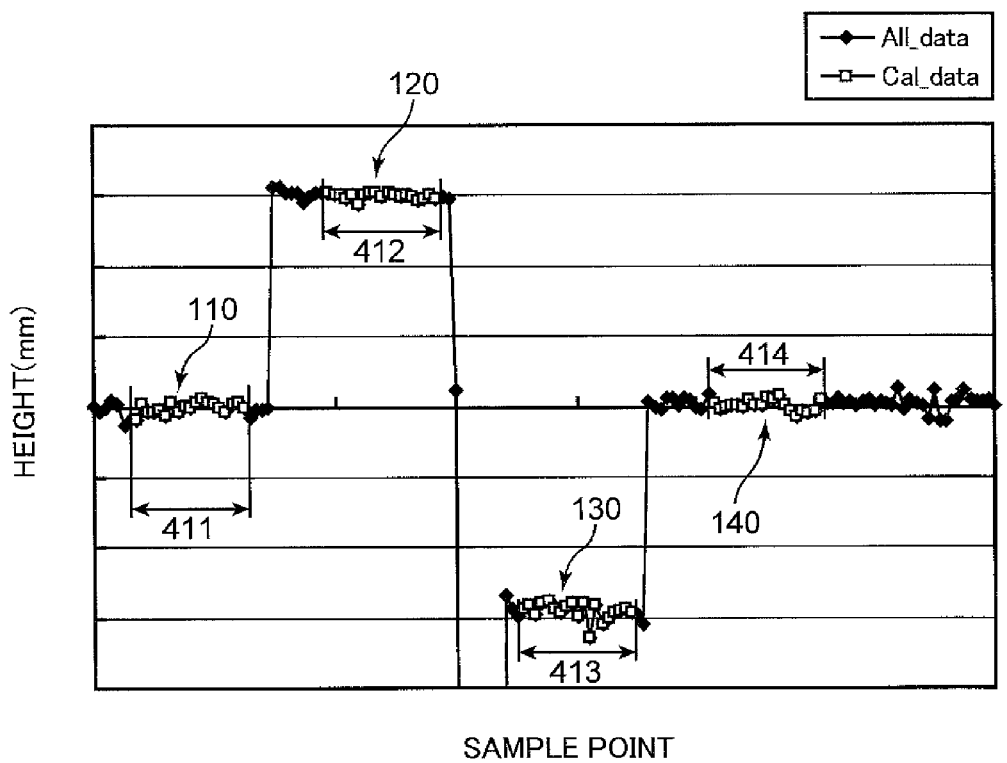

FIG. 7 is a graph illustrating measurement data in one line along a circumferential direction in FIG. 6.

Figure 8:
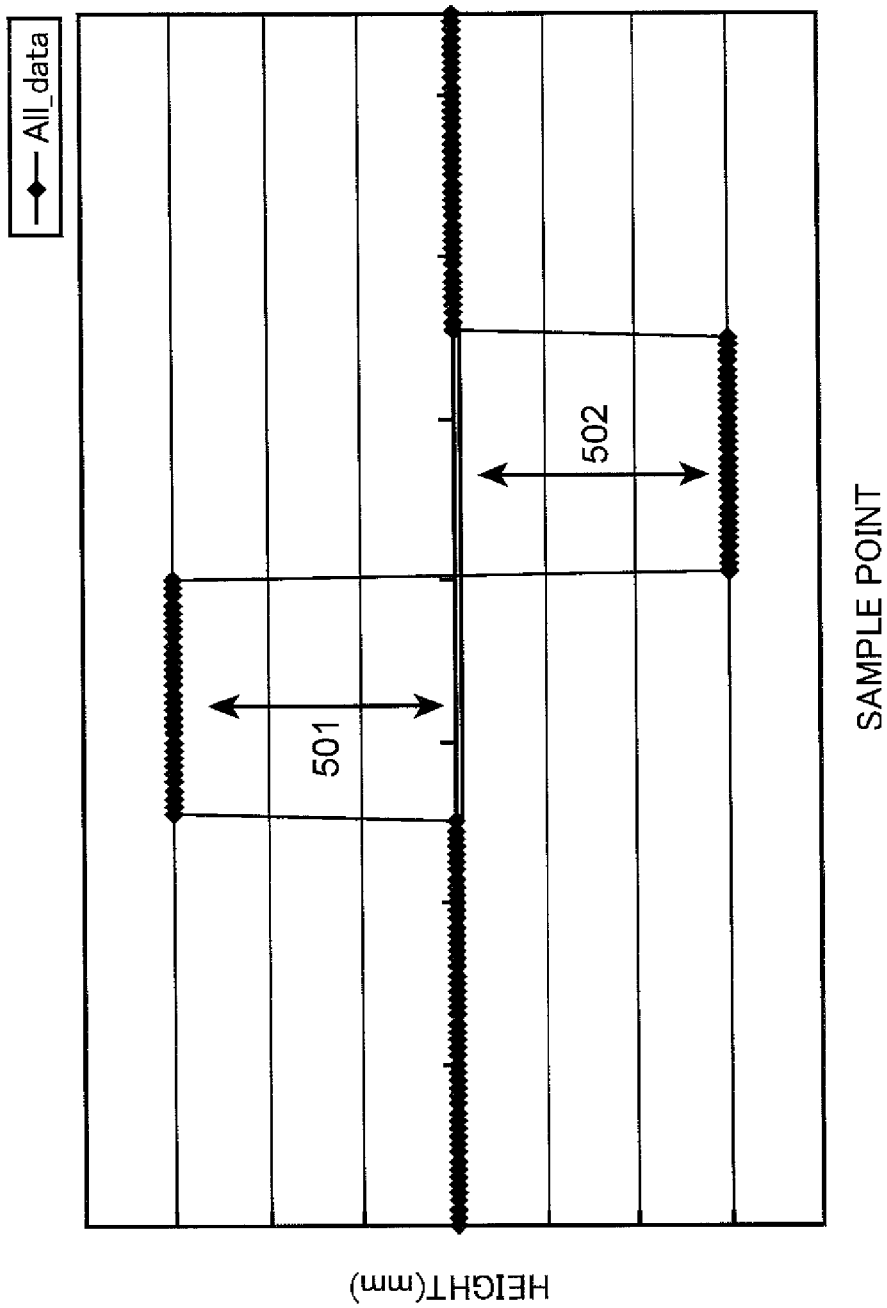

FIG. 8 is a graph illustrating a design height of the raised and depressed plate.

Figure 9:
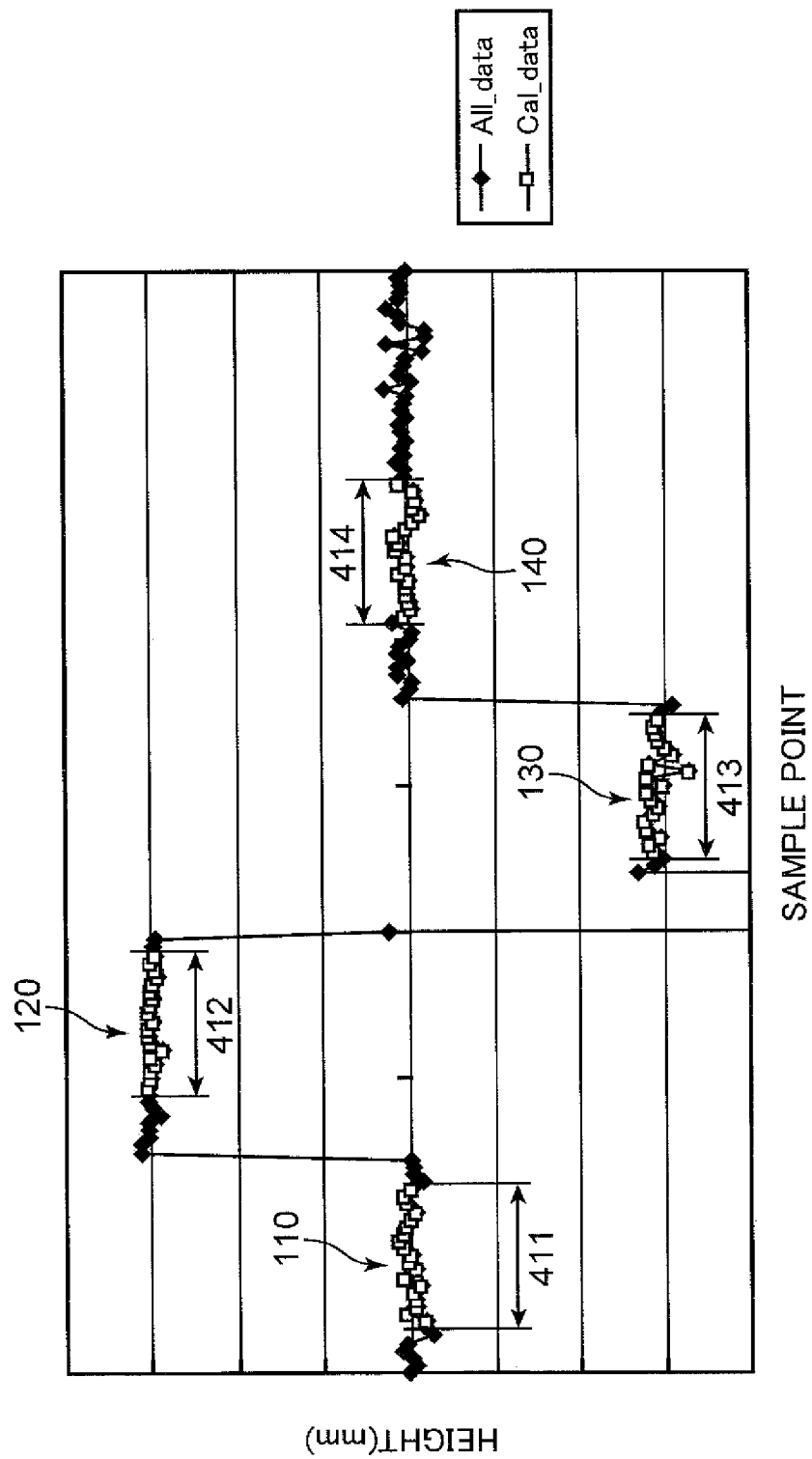

FIG. 9 is a graph illustrating measurement data of one sidewall surface of the master disk, measured using the shape inspection device.

Figure 10:
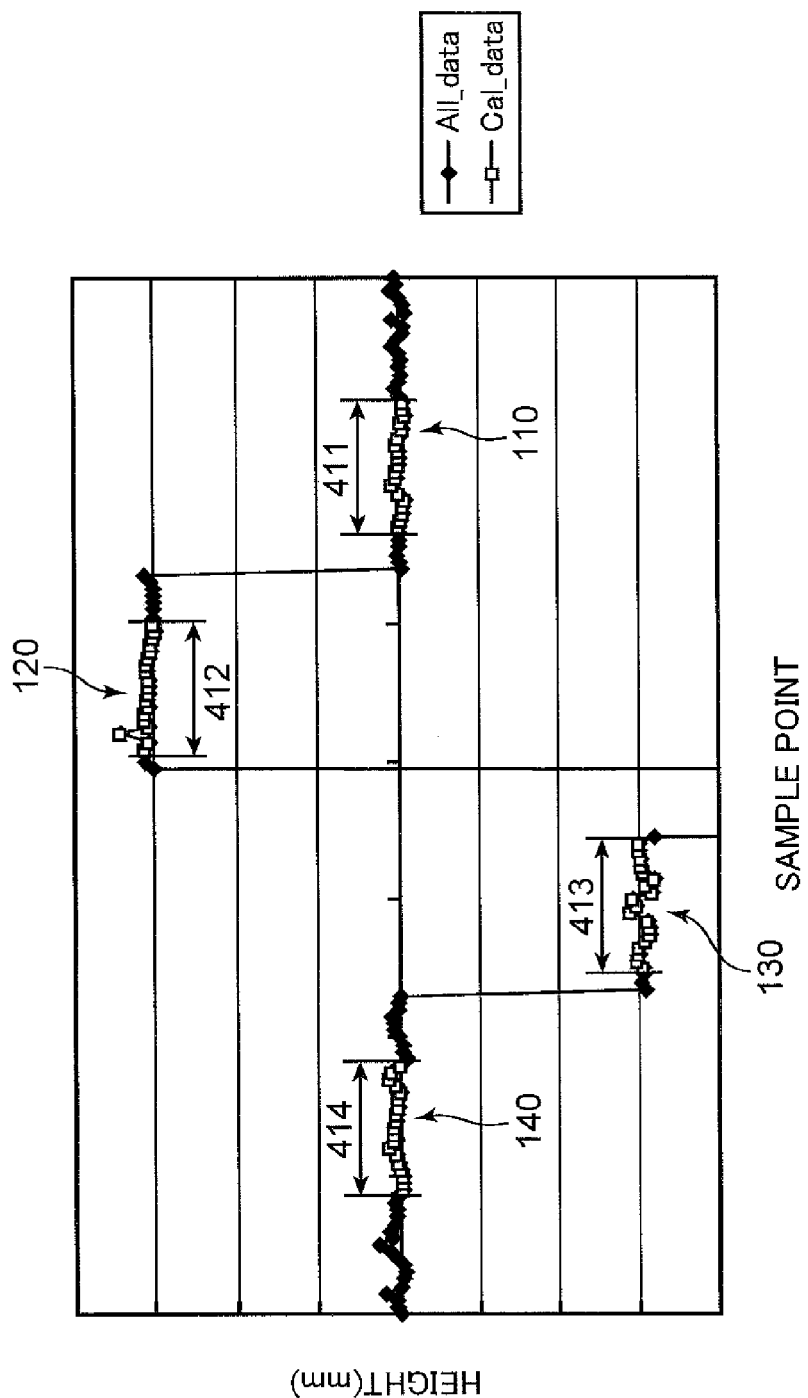

FIG. 10 is a graph illustrating measurement data of the other sidewall surface of the master disk, measured using the shape inspection device.

Figure 11:
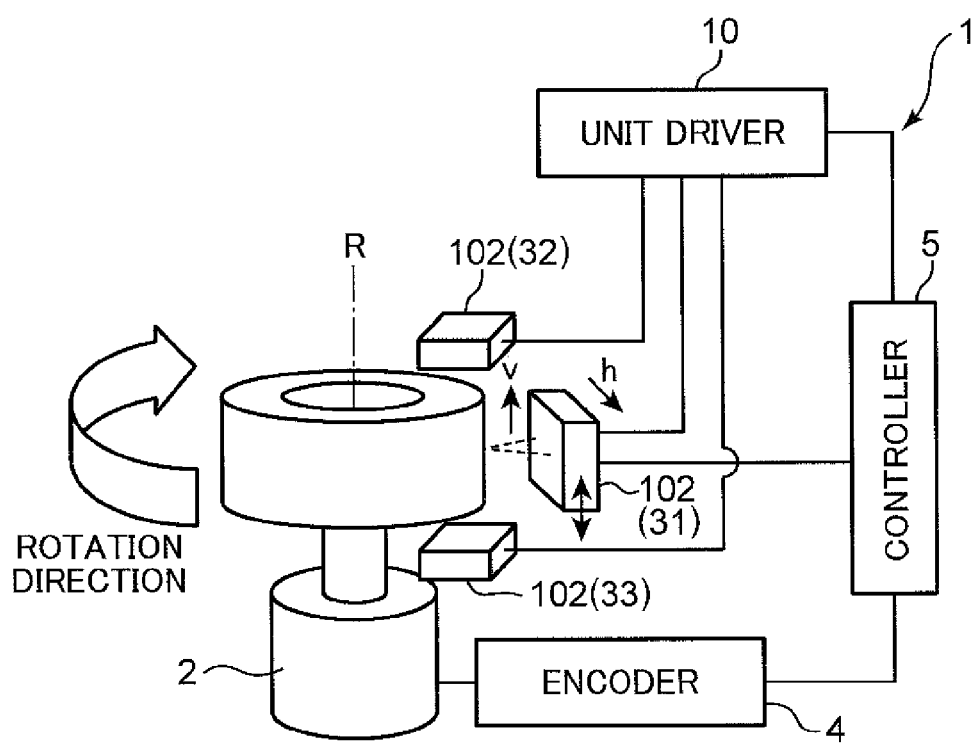

FIG. 11 is an overall configuration diagram of the shape inspection device according to the embodiment of the present invention.

Figure 12:
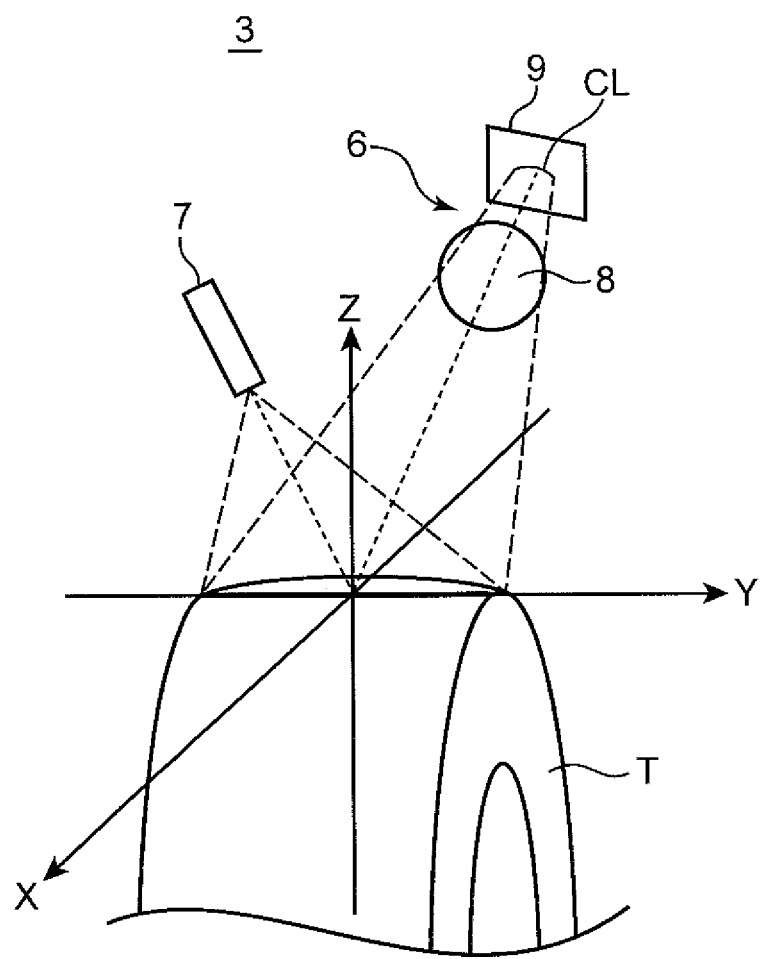

FIG. 12 is a detailed configuration diagram of a sensor unit.

Figure 13:
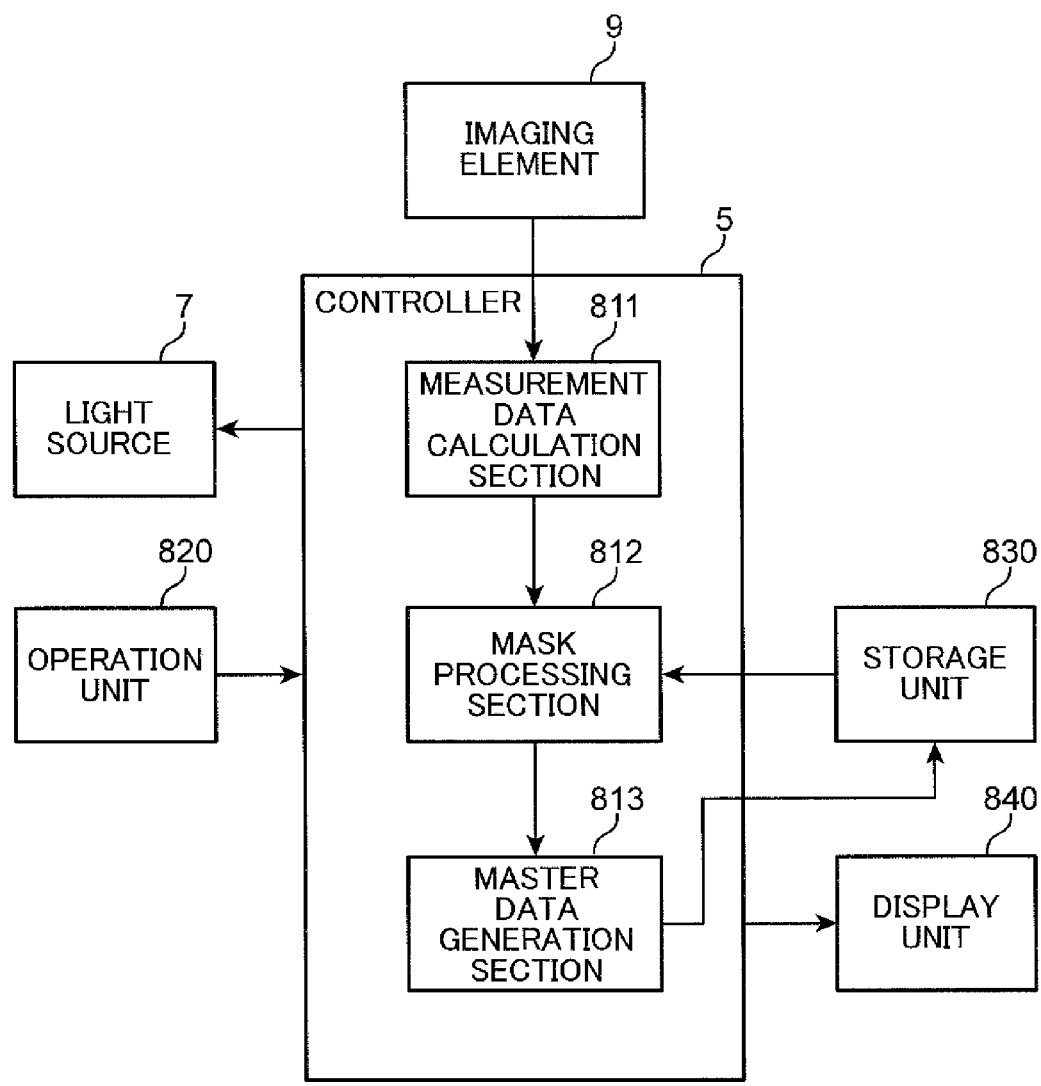

FIG. 13 is a block diagram illustrating configuration of the shape inspection device according to one embodiment of the present invention.

FIG. 14 is a flowchart illustrating a master data generating processing to be implemented in the shape inspection device according to the embodiment of the present invention.

DESCRIPTION OF EMBODIMENTS

Section (A) of FIG. 1 is a diagram illustrating an outline of a hardware configuration of a shape inspection device according to one embodiment of the present invention. The shape inspection device is equipped with a sensor unit 102 and an arm 103. The sensor unit 102 comprises an imaging section and a light source. The light source is configured to emit a light-section beam in a radial direction of a master disk 100, or a tire as a measurement target. The imaging section is configured to pick up an image of the master disk 100 or the tire to which the light-section beam is emitted. The arm 103 is provided at a rear end of the sensor unit 102, and configured to be driven so as to move the sensor unit 102 in the radial direction.

In order to check measurement accuracy of the shape inspection device which is equipped with the sensor unit 102, it is necessary to equip a reference tire whose raised and depressed shape has known shape values. If a tire made of rubber as with commonly-used tires is used as the reference tire, a shape thereof is liable to largely change due to variation in pneumatic pressure and aging degradation thereof. Thus, it is undesirable to employ a rubber tire.

Therefore, in this embodiment, a metal dummy tire which simulates a tire is prepared and used as the master disk 100. The master disk 100 has one sidewall surface S1 onto which a raised and depressed plate 101 is mounted, e.g., in a number of one. Further, onto the other sidewall surface S1, another raised and depressed plate 101 is mounted, e.g., in a number of one. Each of the raised and depressed plates 101 is fixed to the master disk 100 by using a screw 150.

In this embodiment, the raised and depressed plates 101 are arranged on the respective sidewall surfaces S1 in symmetrical relation to each other with respect to a central axis 106 of the master disk 100. The master disk 100 is provided with a space for mounting therein each the raised and depressed plates 101. Preliminarily, shape values of the raised and depressed plate 101 are separately measured on a 1 μm basis by means of a vernier caliper or the like, and used as reference values. The master disk 100 is made of metal and is thereby different from a rubber tire in terms of an optical scattering rate (reflectance). Therefore, it is preferable that the master disk 100 is coated with a black coating to have optical properties approximately equal to those of a rubber tire.

Section (B) of FIG. 1 is a top view of the raised and depressed plate 101, and Section (C) of FIG. 1 is a sectional view of the raised and depressed plate 101, taken along the C-C direction. As illustrated in section (C) of FIG. 1, the raised and depressed plate 101 has a base surface 110, a raised surface 120, a depressed surface 130 and a base surface 140.

The base surface 110 is continuous with and parallel to the sidewall surface S1. The raised surface 120 is formed in such a manner as to be raised from the base surface 110 by a given height, and is parallel to the sidewall surface S1. The depressed surface 130 is formed in such a manner as to be depressed from the base surface 110 by a given height, and is parallel to the sidewall surface S1. The base surface 140 is continuous with and parallel to the sidewall surface S1. The raised surface 120 is adjacent to the base surface 110. The depressed surface 130 is adjacent to the raised surface 120, and the base surface 140 is adjacent to the depressed surface 130. As illustrated in FIG. 1(B), in top view, each of the base surface 110, the raised surface 120, the depressed surface 130 and the base surface 140 has a strip shape.

FIG. 2 is a graph illustrating measurement data of the master disk 100. In FIG. 2, the vertical axis represents height in units of pixel, and the horizontal axis represents sample point on a 360-degree circumference of the sidewall surface S1. In the example illustrated in FIG. 2, the sensor unit 102 picks up an image of the master disk 100 a given number of times (e.g., 1000 to 5000 times) during 360-degree rotation of the master disk 100, and measurement data is derived from the resulting image data. Image data about one image includes a given number (e.g., a number according to a resolution in a vertical direction of the image data) of horizontal lines, in a direction intersecting with the light-section beam. The example illustrated in FIG. 2 shows measurement data at several sample points falling within the range or the raised and depressed plate 101, among the plurality of sample points on a central one of the horizontal lines. As seen from the vertical axis in FIG. 2, a height of the raised and depressed plate 101 varies in a given range.

In FIG. 2, a base line A205 passing in the vicinity of a midpoint of the vertical axis and extending in parallel to the horizontal axis is an auxiliary line for determining respective heights of the raised surface 120 and the depressed surface 130, on the basis of the base surfaces 110, 140.

The base line A205 is determined based on measurement data, for example, of a region A101 corresponding to the base surface 110. However, the measurement data of the region A101 is jagged, as illustrated in FIG. 2. Thus, if the base line A205 is determined using the entire measurement data of the region A101, a line with a slope deviating from a proper slope of the base surface 110 is liable to be calculated as the base line A205.

Moreover, in a region A202 corresponding to a right end of the depressed surface 130, a defective sample point incapable of measurement due to influence of a step between the depressed surface 130 and the base surface 140 is likely to occur, as illustrated in FIG. 2. The presence of such a defective sample point is likely to lead to an undesirable situation where the base line A205 deviates from the proper line of the base surface 110 due to an influence of the defective sample point.

Thus, an aftermentioned mask processing is performed to allow each of respective slopes of the base surfaces 110, 140, the raised surface 120 and the depressed surface 130 to be derived using measurement data of a corresponding partial region of the raised and depressed plate 101, instead of measurement data of the entire region of the raised and depressed plate 101, so that it becomes possible to accurately derive proper slopes of these surfaces. Therefore, in this embodiment, the aftermentioned mask processing is performed.

FIG. 3 is a graph illustrating measurement data corresponding to a 360-degree circumference of a certain one of the plurality of lines. FIG. 4 is a graph enlargedly illustrating measurement data of a region A 301 in FIG. 3 corresponding to the raised and depressed plate 101. FIG. 5 is a graph illustrating a function representing a shape of the raised surface 120, a function representing a shape of the depressed surface 130, and a difference between the two functions.

In FIG. 3 and FIG. 4, the vertical axis and the horizontal axis are the same as those in FIG. 2. In FIG. 5, the vertical axis on the left side represents each height of the raised surface 120 and the depressed surface 130 in units of pixel, on the basis of the base line, and the vertical axis on the right side represents a difference between respective heights of the raised surface 120 and the depressed surface 130 in units of pixel.

As illustrated in FIG. 4, a function representing the shape of the raised surface 120 was calculated from measurement data of the raised surface 120, as follows: $y=a1 \cdot x+b1$, wherein x represents the horizontal axis, and y represents the vertical axis. A function representing the shape of the depressed surface 130 was also calculated, as follows: $y=a2 \cdot x+b2$. Further, a function representing the shape of the base surface 110 was calculated, as follows: $y=a3 \cdot x+b3$. A function representing the shape of the base surface 140 was calculated, as follows: $y=a4 \cdot x+b4$.

This shows that, although each of the slopes of the base surfaces 110, 140, the raised surface 120 and the depressed surface 130 should be 0, it does not become 0, due to jaggies in measurement data and the presence of a defective sample point.

Thus, as illustrated in the graph of FIG. 5, it is proven that each of the heights of the raised surface 120 and the depressed surface 130 largely varies depending on at which of the sample points measurement data to be used is obtained.

As above, the use of the entire measurement data without any modification is likely to lead to an undesirable situation where the measurement accuracy of the shape inspection device is influenced by jaggies in the measurement data and a defective sample point, and thereby becomes impossible to be properly determined.

Meanwhile, as disclosed in the Patent Literature 2, in existing shape inspection devices, master data is preliminarily generated from measurement data of a reference sample tire, and, by using the master data, a raised and/or depressed mark is removed from measurement data of an inspection target tire, whereafter a shape of the tire is evaluated based on the resulting measurement data after the removal. It is also specified that, in a tire shape evaluation test, the evaluation is performed using n or more-order (e.g., about 16 to 100-order) Fourier transform values of measurement data.

Therefore, the existing shape inspection device incorporate a software module configured to remove a raised and/or depressed mark from measurement data of a sample tire, and derive Fourier transform values of the resulting measurement data to calculate master data.

If measurement data of the master disk 100 at all of the sample points is entered to pass through the software module, a sample point with significant jaggies is likely to be recognized as data constituting the raised and/or depressed mark, causing an undesirable situation where measurement data at an unexpected point is removed. Moreover, due to influences of jaggies in the measurement data and a defective sample point, Fourier transform values are liable to largely deviate from values representing a proper shape.

This embodiment is intended to check the measurement accuracy of the shape inspection device without newly providing a measurement mode in the shape inspection device. For this purpose, the measurement accuracy of the shape inspection device is checked by: among all of the sample points of the master disk 100, extracting only measurement data required for checking of the measurement accuracy using mask data; subjecting the extracted measurement data to processing by the software module to calculate master data; and comparing the calculated master data with the known shape values of the raised and depressed plate 101.

FIG. 6 is a schematic diagram of mask data in this embodiment. In FIG. 6, the mask data is illustrated in a manner superimposed on the measurement data of the master disk 100. In FIG. 6, the horizontal axis indicates a circumferential direction, and the vertical axis indicates a radial direction. In FIG. 6, brightness indicates height, wherein higher brightness indicates an area having a larger height, and lower brightness indicates an area having a smaller height.

A region 401 appearing as a strip-like zone over the entire area of the picture in FIG. 6 is a region where measurement data of the sidewall surface of the master disk 100 is disposed. In the middle of the region 401, four valid regions 411 to 414 each having a quadrangular shape with a longitudinal direction in the vertical direction are provided. The valid regions 411 to 414 are provided correspondingly to the base surface 110, the raised surface 120, the depressed surface 130 and the base surface 140 as shown in section (C) of FIG. 1. The remaining region other than the valid regions 411 to 414 is an invalid region. When the measurement data is subjected to mask processing using the mask data, measurement data only of the valid regions 411 to 414 is extracted, and the remaining measurement data of the invalid region is invalidated.

FIG. 7 is a graph illustrating measurement data in one line along the circumferential direction in FIG. 6, wherein the vertical axis represents height in units of mm, and the horizontal axis represents sample point.

As illustrated in FIG. 7, the valid region 411 is provided in a central region of the base surface 110 so as to avoid inclusion of a boundary location with the raised surface 120, instead of the entire region of the base surface. Similarly, the valid region 412 is provided in a central region of the raised surface 120 so as to avoid inclusion of boundary locations with the base surface 110 and the depressed surface 130, instead of the entire region of the raised surface 120. The valid region 413 is provided in a central region of the depressed surface 130 so as to avoid inclusion of boundary locations with the raised surface 120 and the base surface 140, instead of the entire region of the depressed surface 130. The valid region 414 is provided in a central region of the base surface 140 so as to avoid inclusion of a boundary location with the depressed surface 130, instead of the entire region of the base surface 140.

This makes it possible to check the measurement accuracy of the apparatus by using measurement data after removal of a defective sample point.

Setup of the valid regions and the invalid region is preliminarily performed by a manufacturer of the shape inspection apparatus. That is, the manufacturer of the shape measurement apparatus offers a master disk 100 and mask data corresponding to the master disk 100 by the set. A development engineer in the manufacturer of the shape inspection apparatus may create the mask data by: displaying measurement data of the master disk 100; and visually identifying respective positions of the base surfaces 110, 140, the raised surface 120 and the depressed surface 130, on the measurement data, to set the valid regions and the invalid region.

In this case, measurement data of the invalid region at the respective sample points may be calculated using measurement data of the valid regions 411, 414 corresponding to the base surfaces 110, 140. For example, measurement data of the invalid region at the respective sample points may be derived by; extracting measurement data of the valid regions 411, 414 at several ones of the sample points; plotting the extracted pieces of measurement data in the invalid region at even intervals; and subjecting the resulting data to linear interpolation.

FIG. 8 is a graph illustrating a design height of the raised and depressed plate 101, wherein the vertical axis represents height in units of mm, and the horizontal axis represents sample point. In the raised and depressed plate 101 illustrated in FIG. 8, an average height 501 of the raised surface 120 on the basis of the base surfaces 110, 140 is in the range of about 0.5 to 3.0 mm. An average height 502 of the depressed surface 130 on the basis of the base surfaces 110, 140 is in the range of about −0.5 to −3.0 mm.

FIG. 9 is a graph illustrating master data of one sidewall surface of the master disk 100, generated by the shape inspection device, wherein the vertical axis represents height in units of mm, and the horizontal axis represents sample point. FIG. 10 is a graph illustrating master data of the other sidewall surface of the master disk 100, measured using the shape inspection device, wherein the vertical axis represents height in units of mm, and the horizontal axis represents sample point.

Using respective pieces of measurement data of the valid regions 411 to 414 in FIG. 9, respective average heights of the raised surface 120 and the depressed surface 130 on the basis of the base surfaces 110, 140 were calculated. As a result, the average heights of the raised surface 120 and the depressed surface 130 were approximately coincident with the design heights of the raised surface 120 and the depressed surface 130 of the master disk 100, respectively.

Further, using respective pieces of measurement data of the valid regions 411 to 414 in FIG. 10, respective average heights of the raised surface 120 and the depressed surface 130 on the basis of the base surfaces 110, 140 were calculated. As a result, the average heights of the raised surface 120 and the depressed surface 130 were approximately coincident with the design heights of the raised surface 120 and the depressed surface 130 of the master disk 100, respectively. This proves that accurate heights of the raised surface 120 and the depressed surface 130 can be obtained by subjecting the measurement data to the mask processing using the mask data.

FIG. 11 is an overall configuration diagram of the shape inspection device according to this embodiment. The shape inspection device comprises a rotating unit 2, the sensor unit 102, an encoder 4, a controller 5, and a unit driver 10. The rotating unit 2 is configured to rotate a tire or the master disk (these will hereinafter be referred to collectively as "measurement object T") about its central axis serving as a rotation axis R. Specifically, the rotating unit 2 comprises a shaft attached along the central axis, and a motor for rotating the shaft. For example, as a rotational speed at which the measurement object T is rotated by the rotating unit 2, a value of 60 rpm may be employed.

The sensor unit 102 includes: a sensor unit 31 provided on the side of a tread surface of the measurement object T; a sensor unit 32 provided just above a sidewall surface of the measurement object T; and a sensor unit 33 provided just below a sidewall surface of the measurement object T. The sensor unit 31 is used to measure the tread surface. The sensor unit 32 is used to measure the upper sidewall surface, and the sensor unit 33 is used to measure the lower sidewall surface.

The sensor unit 31 is configured to emit a slit-shaped light-section beam to the measurement object T being rotated, in a radial direction of the measurement object T, to scan the light-section beam in a circumferential direction of the tread surface, and receive a reflected beam from the measurement object T to acquire measurement data of the entire tread surface.

Each of the sensor units 32, 33 is configured to emit a light-section beam to the measurement object T to acquire measurement data of a corresponding one of the entire sidewall surfaces, in the same manner as that in the sensor unit 31.

The encoder 4 is configured to output an angular signal indicative of a rotation angle, every time the measurement object T is rotated by a given angle. The angular signal is used for determining a measurement timing of the sensor unit 102.

The controller 5 comprises, for example, a dedicated hardware circuit and a CPU, wherein the controller 5 is operable to subject measurement data output from the sensor unit 102 to aftermentioned processing. The unit driver 10 comprises three arms (illustration is omitted) for setting respective positions of the sensor units 31 to 33, and three motors for moving the three arms, respectively, wherein the unit driver 10 is operable to set the positions of the sensor units 31 to 33 under control of the controller 5.

It should be noted that, although the embodiment illustrated in FIG. 11 has been described based on an example where the set of sensor units 31 to 33 are provided as the sensor unit 102, the present invention is not limited thereto. For example, one or two of the sensor units 31 to 33 may be omitted.

FIG. 12 is a detailed configuration diagram of the sensor unit 102. FIG. 12 illustrates the sensor unit 102 during measurement of the tread surface. In FIG. 12, the Y axis and the Z axis represent, respectively, a direction parallel to the rotation axis R (see FIG. 11) and a direction normal to the tread surface, and X axis represents a direction perpendicular to each of the X axis and the Y axis.

A light source 7 comprises a semiconductor laser and a cylindrical lens, wherein the light source 7 is operable to emit a light-section beam to the measurement object T. In this embodiment, the light source 7 is configured to emit the light-section beam from a direction intersecting with the Z axis. The measurement object T is being rotated by the rotating unit 2, so that the light-section beam can be scanned over the entire region of the tread surface of the measurement object T.

A camera 6 comprises a camera lens 8 and an imaging element 9. The camera lens 8 is configured to lead a reflected bean from the tread surface to the imaging element 9. The imaging element 9 is composed, for example, of an image sensor such as a CCD sensor or CMOS sensor, and operable to receive the reflected beam via the camera lens 8. Specifically, the imaging element 9 is configured to pick up an image of the tread surface under control of the controller 5. It is desirable that the reflected beam is a specularly reflected beam. Thus, the camera lens 8 is configured to lead such a specularly reflected beam to the imaging element 9.

FIG. 13 is a block diagram illustrating a configuration of the shape inspection device according to this embodiment. The shape inspection device comprises the light source 7, the imaging element 9 (one example of a measuring section), the controller 5, an operation unit 820, a storage unit 830, and a display unit 840. The imaging element 9 is configured to pick up an image of the master disk 100 irradiated with a light-section beam, at a given frame rate.

The light source 7 is configured to emit the light-section beam to the measurement object T. The controller 5 is composed, for example, of a FPGA, and comprises a measurement data calculation section 811 (one example of the measuring section), a mask processing section 812, and a master data generation section 813. The operation unit 820 is composed, for example, of an input device such as a keyboard or a mouse, and configured to accept an operational instruction from a user.

The measurement data calculation section 811 is operable to detect a position of a light-section beam from image data picked-up by the imaging element 9. More specifically, the measurement data calculation section 811 is operable, every time the imaging element 9 acquires one piece of image data, to detect a position of a light-section beam CL included in the image data. Assuming that, in the imaging element 9 illustrated in FIG. 12, a vertical coordinate axis is set in a direction intersecting with the light-section beam CL, and a horizontal coordinate axis is set in a direction along the light-section beam CL, the measurement data calculation section 811 is operable to detect, at a pixel or sub-pixel level, a coordinate at which brightness reaches a peak in each of a plurality of vertical lines, whereby the coordinate is detected as a position of the light-section beam CL.

Then, the measurement data calculation section 811 is operable, based on the detected positions, to calculate each height data of each locations of the light-section beam, by using the principle of triangulation, whereby a group of data consisting of the height data is calculated as measurement data of one line along a radial direction.

Then, the measurement data calculation section 811 is operable to arrange the one-line measurement data in a matrix pattern to thereby calculate measurement data of the entire measurement surface of the measurement object T. For example, assuming that the number of pieces of height data making up the one-line measurement data is M, and the number of pieces of image data picked-up by the imaging element 9 is N, the calculate measurement data contains height data arranged in an M (row)×N (column) matrix pattern. As regards measurement data of an inspection target tire, the measurement data calculation section 811 is operable to perform calculation in the same manner as that for the master disk 100.

The mask processing section 812 is configured to subject the measurement data calculated by the measurement data calculation section 811 to mask processing using mask data, and output the resulting measurement data, as processing target data, to the master data generation section 813. In this embodiment, the mask processing section 812 is configured to perform the mask processing only when measurement accuracy of the shape inspection device is evaluated, without performing the mask processing in any other case. In this case, the measurement data calculated by the measurement data calculation section 811 is outputted to the master data generation section 813.

As the mask data, it is possible to employ the mask data illustrated in FIG. 6, i.e., mask data in which respective parts of the base surface 110, the raised surface 120, the depressed surface 130 and the base surface 140 are defined as valid regions 411 to 412, respectively, and the remaining region other than the valid regions is defined as an invalid region.

Specifically, the mask processing section 812 is operable to extract four pieces of measurement data of the valid regions 411 to 414 from the measurement data of the master disk 100.

The mask processing section 812 is also operable to plot measurement data at several sample points making up the valid regions 411, 422 corresponding to the base surfaces 110, 140, and derive measurement data of the invalid region by means of linear interpolation. For example, in the case where total 16 pieces of measurement data: four pieces in a vertical direction; and four pieces in a horizontal direction, are plotted, 8 pieces of measurement data may be extracted from the base surface 110 and plotted in the invalid region on a left side of the valid region 411 in a 4 (row)×2 (column) pattern at even intervals, and further 8 pieces of measurement data may be extracted from the base surface 140 and plotted in the invalid region on a right side of the valid region 414 in a 4 (row)×2 (column) pattern at even intervals. Then, the mask processing section 812 may subject the 16 pieces of plotted measurement data to linear interpolation to thereby derive measurement data of the invalid region at the remaining sample points. Then, the mask processing section 812 may output the resulting measurement data of the invalid regions and the invalid region, as the processing target data, to the master data generation section 813.

The master data generation section 813 is composed of the aforementioned software module for detecting and removing a raised and/or depressed mark from measurement data of a sample tire, and deriving Fourier transform values of the resulting measurement data to calculate master data. In this embodiment, the processing target data is data from which any defective sample point has already been removed. Thus, when the processing for removing the raised and/or depressed mark is executed, no raised and/or depressed mark will be detected. The master data is configured to indicate a surface shape of the measurement surface of the master disk 100.

The master data generation section 813 is operable to instruct the display unit 840 to display the master data, e.g., in the form of a graph. Thus, a user can evaluate the measurement accuracy of the shape inspection device by comparing the master data with known shape values of the raised and depressed plate 101. For example, assume that, in FIG. 2, master data indicating that the raised surface 120 and/or the depressed surface 130 are inclined with respect to the horizontal direction is displayed on the display unit 840. In this case, the user can determine that the measurement accuracy of the shape inspection device is bad. Then, the user can adjust the shape inspection device so as to improve the measurement accuracy thereof.

On the other hand, when master data indicating that the raised surface 120 and/or the depressed surface 130 are parallel to the horizontal direction as illustrated in FIG. 7 is displayed on the display unit 840, a user can evaluate that the measurement accuracy of the shape inspection device is good.

The storage unit 830 is configured to store therein mask data preliminarily created by a user. In this embodiment, a plurality of different mask data are created depending on types of the master disk 100. In this case, the storage unit 830 may store therein each of the plurality of master data in association with a disk ID identifying the master data. Thus, the mask processing section 812 is operable, when a disk ID is designated by a user during measurement of the master disk 100, to read mask data corresponding to the designated disk ID from the storage unit 830 and perform mask processing using the read mask data. The storage unit 830 is also operable to store therein master data generated by the master data generation section 813.

The display unit 840 is composed, for example, of a liquid crystal display, and operable to display measurement data calculated by the measurement data calculation section 811 in the form of a graph, and display master data generated by the master data generation section 813.

FIG. 14 is a flowchart illustrating a master data generating processing to be implemented in the shape inspection device according to this embodiment. First of all, the imaging element 9 picks up an image of the master disk 100 irradiated with the light-section beam to obtain one piece of image data (S901). Then, when the master disk 100 has not been rotated 360 degrees (NO in S902), the process returns to the S901, wherein the imaging element 9 operates to obtain next one piece of image data. On the other hand, when the master disk 100 has been rotated 360 degrees (YES in S902), the process advances to S903. That is, the imaging element 9 repeatedly picks up an image of the master disk 100 irradiated with the light-section beam at a given frame rate, until the master disk 100 is rotated 360 degrees.

In the S903, the measurement data calculation section 811 operates to detect a position of the light-section beam in each of a plurality of pieces of image data picked-up by the imaging element 9 to calculate each height data of each locations of irradiated with the light-section beam, by using the principle of triangulation, thereby calculating measurement data of the entire region of the master disk 100.

Then, the mask processing section 812 operates to subject the measurement data to the mask processing using the mask data (S904). Then, the mask processing section 812 operates to derive measurement data of the invalid region at respective sample points by interpolation using measurement data of the valid region (S905).

Then, the mask processing section 812 operates to output the measurement data of the valid region and the interpolated measurement data of the invalid region, as the processing target data, to the master data generation section 813 (S906). Then, the master data generation section 813 operates to subject the processing target data to processing for removing a raised and/or depressed mark, and processing for deriving Fourier transform values, to thereby calculate master data (S907).

Then, the master data generation section 813 operates to display the master data on the display unit 840 in the form of a graph. In this process, the master data generation section 813 may operate to display the master data on the display unit 840 in such a manner as to represent a certain one of a plurality of circumferential lines by means of a graph. Further, the master data generation section 813 may operate to, in response to receiving a user's instruction designating one of the circumferential lines, from the operation unit 820, display the master data on the display unit 840 in such a manner as to represent the designated line by means of a graph.

A user visually observes the master data displayed on the display unit 840 to check the measurement accuracy of the shape inspection device.

As above, the shape inspection device according to the above embodiment, the master data is generated by using only a part of the measurement data of the base surfaces 110, 140, the raised surface 120 and the depressed surface 130 of the raised and depressed plate 101 provided on the master disk 100. Thus, it becomes possible to obtain master data on which a shape of the master disk 100 is accurately reflected, without providing any special measurement mode in an existing shape inspection device, thereby accurately performing checking of the measurement accuracy of the shape inspection device.

In the above embodiment, measurement data of the invalid region at respective sample points is derived by interpolation using the measurement data of the valid regions at some sample points. However, the present invention is not limited thereto, but the master data may be calculated by using measurement data of the valid region as the processing data.

In the above embodiment, the measurement surface is a sidewall surface. Alternatively, the measurement surface may be a tread surface. In this case, the raised and depressed plate 101 may be provided on the tread surface.

OUTLINE OF EMBODIMENT

According to one aspect of the present invention, there is provided a shape inspection device for measuring a surface shape of a tire to inspect bulge and dent defects of the tire based on a result of the measurement. The shape inspection device comprises: a measuring section configured to measure a surface shape of a measurement surface of a metal master disk which simulates the tire, wherein the measurement surface mounts thereon a raised and depressed plate having known shape values; a mask processing section configured to use mask data in which a given region of the raised and depressed plate is defined as a valid region and the remaining region other than the valid region is defined as an invalid region, to remove measurement data of the invalid region from measurement data measured by the measuring section; and a master data generation section configured to generate master data representing the surface shape of the measurement surface of the master disk, based on the measurement data after being subjected to removal of the invalid region by the mask processing section.

In this shape inspection device, using mask data in which a given region of the raised and depressed plate is defined as a valid region and the remaining region other than the valid region is defined as an invalid region, measurement data of the invalid region is removed from measurement data of the master disk, and, based on the resulting measurement data, master data representing the surface shape of the measurement surface of the master disk is generated.

Thus, a user can check measurement accuracy of the shape inspection device by comparing data comprised in the master data and representing the surface shape of the raised and depressed plate with the known shape values of the raised and depressed plate. In addition, instead of measurement data of the entire region of the master disk, only a part of measurement data of the valid region of the raised and depressed plate is extracted and used to generate the master data, so that it becomes possible to prevent the occurrence of a situation where master data representing a shape largely deviating from a proper shape of the master disk is generated due to an influence of defective data as a result of failure of an actual measurement caused by shadow or the like.

In existing shape inspection device, master data is generated by subjecting measurement data of the entire region of a master tire to processing for removing a raised and/or depressed mark, and Fourier transform processing. Differently, in the above shape inspection device, the master data is generated by using only the measurement data of the valid region, instead of the entire region of the master disk. Thus, even if measurement data as processing target data is subjected to the processing for removing a raised and/or depressed mark, it is possible to prevent the occurrence of a situation where the processing for removing a raised and/or depressed mark is applied to an unexpected point, or Fourier transform values largely diverging from an actual shape of the raised and depressed plate are obtained. This makes it possible to accurately check the measurement accuracy of the shape inspection device, without providing any special measurement mode in an existing shape inspection device.

A rubber master tire is liable to have a large undulation due to an influence of air put into a master tire. Differently, in the above shape inspection device, the metal master disk is employed, so that there is no possibility of having such a large undulation. Thus, it becomes possible to prevent the occurrence of a situation where the measurement accuracy of the shape inspection device is determined to be degraded, due to an influence of the undulation.

Preferably, in one embodiment of the present invention, the raised and depressed plate has two base surfaces each continuous with the measurement surface, a raised surface raised from the measurement surface, and a depressed surface depressed from the measurement surface, wherein the valid region is provided in each of one of the base surfaces, the other base surface, the raised surface and the depressed surface, in a number of one for each surface.

In this embodiment, the valid region is provided in each of the two base surfaces, the raised surface and the depressed surface of the raised and depressed plate, in a number of one for each surface. Thus, it becomes possible to prevent the occurrence of a situation where measurement data of an area having a significant surface height variation is included in the processing target data, i.e., defective data is included in the processing target data.

In another embodiment of the present invention, the shape inspection device may further comprise a storage unit preliminarily storing therein a plurality of pieces of different mask data created depending on types of the master disk, wherein the mask processing section may be configured to remove the measurement data of the invalid region, using one of the pieces of mask data corresponding to the master disk measured by measuring section.

In this embodiment, mask data corresponding to a type of the master disk is used. Thus, it becomes possible to prevent the occurrence of a situation where the valid region is provided on the master disk at a position different from a position of an actual raised and depressed plate.

(4) the measuring section may be configured to measure the surface shape of the measurement surface by a light-section method.

In this embodiment, the shape of the measurement surface of the master disk is measured by a light-section method. Thus, it becomes possible to measure the surface shape of the entire measurement surface at high speeds, as compared to case of using a spot beam.

(5) the measurement surface may be a sidewall surface.

In this embodiment, measurement accuracy of the shape inspection device during measurement of the sidewall surface can be checked.

The invention claimed is:

1. A shape inspection device for measuring a surface shape of a tire to inspect bulge and dent defects of the tire based on a result of the measurement, comprising:
   a measuring section configured to measure a surface shape of a measurement surface of a metal master disk which simulates the tire, the measurement surface mounting thereon a raised and depressed plate having known shape values;
   a mask processing section configured to use mask data in which a given region of the raised and depressed plate is defined as a valid region and the remaining region other than the valid region is defined as an invalid region, to remove measurement data of the invalid region from measurement data measured by the measuring section; and
   a master data generation section configured to generate master data representing the surface shape of the measurement surface of the master disk, based on the measurement data after being subjected to removal of the invalid region by the mask processing section.

2. The shape inspection device according to claim 1, wherein the raised and depressed plate has two base surfaces each continuous with the measurement surface, a raised surface raised from the measurement surface, and a depressed surface depressed from the measurement surface, and wherein the valid region is provided in each of one of the base surfaces, the other base surface, the raised surface and the depressed surface, in a number of one for each surface.

3. The shape inspection device according to claim 1, which further comprises a storage unit preliminarily storing therein a plurality of pieces of different mask data created depending on types of the master disk, wherein the mask processing section is configured to remove the measurement data of the invalid region, using one of the pieces of mask data corresponding to the master disk measured by the measuring section.

4. The shape inspection device according to claim 1, wherein the measuring section is configured to measure the surface shape of the measurement surface by a light-section method.

5. The shape inspection device according to claim 1, wherein the measurement surface is a sidewall surface.

* * * * *